United States Patent [19]
Popat et al.

[11] Patent Number: 5,224,008
[45] Date of Patent: Jun. 29, 1993

[54] SURGE PROTECTION DEVICE AND SYSTEM

[75] Inventors: Pravin Popat, Norton; Diethard Unterweger, Plainville; Ronald J. Candelet, Attleboro, all of Mass.

[73] Assignee: Texas Instruments Incorporated, Dallas, Tex.

[21] Appl. No.: 720,980

[22] Filed: Jun. 25, 1991

[51] Int. Cl.[5] ............................................. H02H 3/24
[52] U.S. Cl. ..................................... 361/56; 361/118; 361/127
[58] Field of Search ................... 361/56, 54, 103, 111, 361/117, 118, 127

[56] References Cited

U.S. PATENT DOCUMENTS

| | | | |
|---|---|---|---|
| 1,324,334 | 12/1919 | Boving | 361/56 |
| 1,457,249 | 5/1923 | Janson et al. | 361/118 |
| 2,199,630 | 5/1940 | Hodnette | |
| 3,928,093 | 12/1975 | van Tongerloo | 148/186 |
| 3,936,785 | 2/1976 | Novak | 337/29 |
| 4,063,127 | 12/1977 | Le Cain et al. | 313/325 |
| 4,325,097 | 4/1982 | Clark | 361/56 |
| 4,459,632 | 7/1984 | Nijiman et al. | 361/56 |
| 4,760,439 | 7/1988 | Borkowicz | 357/39 |
| 4,851,956 | 7/1989 | Borkowicz et al. | 361/118 |
| 4,878,423 | 4/1975 | Hill et al. | 313/267 |
| 4,939,619 | 7/1990 | Borkowicz | 361/117 |

FOREIGN PATENT DOCUMENTS 2113907B 3/1986 United Kingdom .
2205685A 12/1988 United Kingdom .

OTHER PUBLICATIONS

"Telecommunications Protector Circuits-Protection Design Guide", Texas Instruments Ltd., Bedford England.

Primary Examiner—A. D. Pellinen
Assistant Examiner—S. Jackson
Attorney, Agent, or Firm—Russell E. Baumann; Richard L. Donaldson; René E. Grossman

[57] ABSTRACT

A surge protection system has a surge protection device comprising a semiconducting disc element disposed between two electrodes. The element is operable to selectively conduct electrical energy between the electrodes in providing a first level of surge protection for the circuit, and the electrodes are adapted to move toward each other to maintain a short circuit condition between the electrodes in the event the element is destroyed in providing a second relatively greater level of surge protection. The semiconducting element provides a critical energy conduction path between a selected limited portion of one side of the element and the other element side along which destruction of the element preferentially occurs due to overheating in providing the second level of surge protection. One electrode has a selected limited post portion disposed in electrical engagement with said selected limited portion of said one element side to facilitate establishment and maintenance of the short circuit condition between the electrodes in providing the second level of surge protection.

28 Claims, 3 Drawing Sheets

SURGE PROTECTION DEVICE AND SYSTEM

BACKGROUND OF THE INVENTION

The field of the invention is that of surge protection systems and the invention relates more particularly to systems having solid state surge protection elements.

Solid-state surge protection systems conventionally employ a surge protection device having a semiconducting element between a pair of electrodes. This element is arranged in the circuit to selectively conduct electrical energy between a portion of a telephone circuit and ground, for example, in the event the circuit experiences an electrical surge as a result of lightning or short circuit or the like in the circuit, thereby to protect electrical components connected in the circuit from damage due to the surge condition. On occasion, the circuit will experience an electrical surge which results in destruction of the semiconducting element so that the circuit components would not thereafter be protected against subsequently occurring electrical surge conditions. Accordingly, the conventional surge protection systems typically incorporate means tending to move the electrodes into electrical engagement with each other following destruction of the semiconducting element, thereby to maintain a short circuit condition between the electrodes to protect the circuit components against subsequently occurring surge conditions until such time as the semiconducting element is replaced. Frequently, however, difficulty is encountered in establishing and maintaining the desired short circuit condition between the electrodes following destruction of the semiconducting element. It would be desirable to arrange the surge protection device in a surge protection system to provide more assured protection for the circuit components by more rapidly establishing the desired short circuit condition on occurrence of a substantial electrical surge in the circuit.

BRIEF SUMMARY OF THE INVENTION

It is an object of the invention to provide a novel and improved surge protection system; to provide a novel and improved surge protection device for use in such a system; to provide such an improved surge protection device which provides desired surge protection with improved reliability; and to provide such a surge protection device which provides desired surge protection with improved speed for protecting circuit components in the system on occurrence of a substantial electrical surge in the system.

Briefly described, the novel and improved surge protection system of the invention comprises a circuit and a novel and improved surge protection device providing first and second levels of surge protection for the circuit and for electrical components in the circuit. The improved surge protection device comprises a semiconducting element having first and second electrodes disposed in electrically conductive relation with respective opposite sides of the element and the element is normally operable to selectively conduct electrical energy between the electrodes to provide a first level of surge protection for the circuit. For example, in one preferred embodiment, the electrodes are connected to a portion of a telephone circuit and to ground respectively, and the semiconducting element is non-conductive under normal telephone circuit voltage conditions. The element becomes conductive on occurrence of selected surge voltages in the circuit due to lightning or the like for connecting the circuit to ground to protect the circuit and circuit components from the voltage surge. When the surge condition has passed, the semiconducting element returns to its non-conductive condition permitting resumption of normal circuit operation. In that way the surge protection device provides a first level of surge protection for the circuit or system.

The electrodes are adapted to move toward each other to maintain a short circuit condition between the electrodes in the event the device is destroyed as a result of being subjected to a greater electrical surge exceeding the first level of surge protection as described above, thereby to provide a second level of surge protection. Typically for example, the device electrodes are resiliently engaged between spring-loaded electrical contact arms or the like to be biased together by the spring contact-arm loading in the event the semiconducting element is destroyed by the noted greater surge conditions. In accordance with this invention, a first one of the electrodes is disposed in electrical engagement with a limited portion of one side of the semiconducting element to facilitate establishment and maintenance of the desired short circuit condition between the electrodes in the event of element destruction. Preferably the semiconducting element is provided with a critical energy conduction path between opposite sides of the element along which destruction of the element preferentially occurs when the element is destroyed by overheating or the like in providing the second level of surge protection, that path extending between a selected limited portion of said one side of the element and the other element side. Preferably also, the first electrode comprises a disc part and post part of lesser cross sectional size than the disc part. A distal end of the post part of the first electrode is then secured in electrically conductive relation to said selected limited portion of said one side of the element, whereby as destruction of the semiconducting element occurs along the critical energy conduction path, the post part of the first electrode readily and reliably passes through the element along that path to be electrically engaged in short circuit condition with the second electrode for providing the second level of surge protection. In a preferred embodiment of the invention, the second electrode has a recess therein and the above-noted opposite side of the semiconducting element is received within the recess to be aligned in predetermined relation to the second electrode. Preferably the first electrode has a disc part proportioned to be coextensive with the second electrode and the semiconducting element is selected to be operable with either polarity for facilitating mounting the device between contact arms and the like in a system with alternate polarity. Preferably the coextensive electrodes also aid in aligning the post part of the first electrode with the critical energy conduction path of the second conducting element.

Preferably a seal such as an environmental seal of an electrically insulating seal coating or the like is disposed over a portion of said one side of the semiconducting element around the post part of the first electrode. In one preferred embodiment of the invention, the seal is spaced from the disc part of the first electrode to facilitate movement of the electrodes into short circuit condition in providing the second level of surge protection. In another preferred embodiment of the invention, the seal is provided with a selected limited thickness and with brittleness to be readily broken by bias of the electrodes toward each other in the event of destruction of the semiconducting element to provide the second level of surge protection. In another preferred embodiment, the seal is selected to be destroyed during overheating of the semiconducting element resulting in destruction of the element, thereby to facilitate movement of the electrodes into short circuit condition.

DESCRIPTION OF THE DRAWINGS

Other objects, advantages and details of the novel and improved surge protector device and system of the invention appear in the following detailed description of preferred embodiments of the invention, the detailed description referring to the drawings in which.

DESCRIPTION OF THE PREFERRED EMBODIMENTS

Figure 4A:
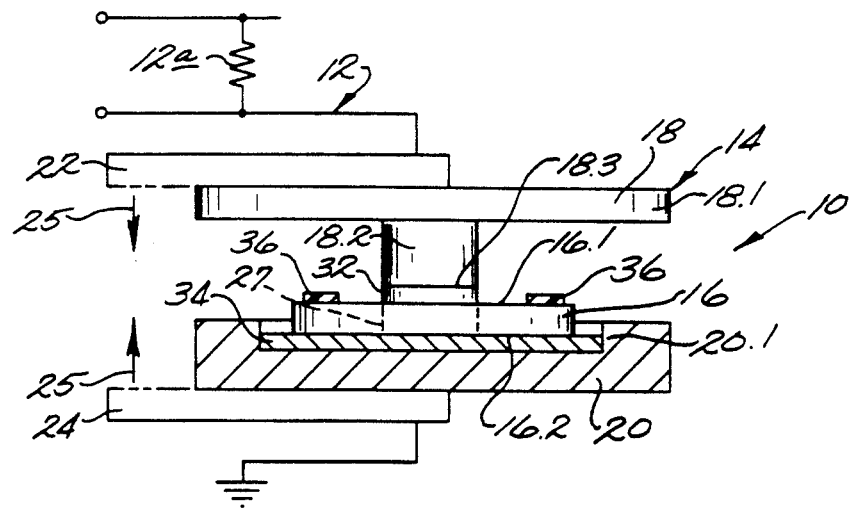
FIG. 4A is a section view along a central axis of a preferred embodiment of the surge protector device of the invention illustrating the device in a surge protection system in condition to protect an operating telephone circuit for example.
Figure 4B:
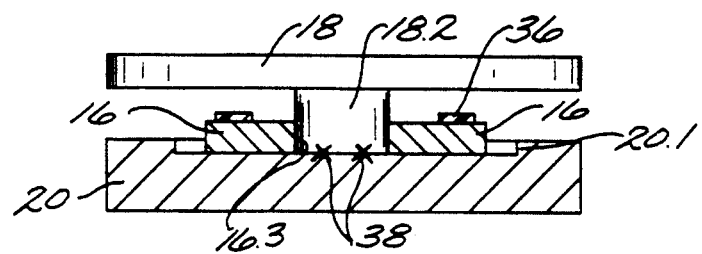
FIG. 4B is a section view similar to FIG. 4A illustrating the device in shorted condition in the system.

Referring to the drawings, 10 in FIG. 4A indicates a preferred embodiment of the novel and improved surge protection system of the invention which is shown to include a circuit 12 and a surge protection device 14 arranged to provide first and second levels of surge protection for the circuit 12. The surge protection device includes a semiconducting surge protection element 16 having electrodes 18 and 20 disposed in electrically conductive relation with respective opposite sides 16.1, 16.2 of the element. The semiconducting element is normally nonconductive but is adapted to become conductive when a selected level of voltage is applied to the element across the electrodes, thereby to provide a first level of surge protection for the circuit. The semiconducting element is adapted to become nonconducting again following removal of the voltage surge condition to permit resumption of normal operation of the circuit 12. The electrodes are arranged to move toward each other and to be electrically engaged with each in short circuit condition in the event the semiconducting element is destroyed by an electrical surge in the circuit exceeding first level of the surge protection, thereby to provide a second level of surge protection and assure that the circuit is protected against subsequent surge conditions until the destroyed semiconducting element has been replaced. Typically for example, contact arms 22, 24 in the circuit 12 are resiliently biased toward each other as indicated at 25 by spring means or the like, the contact arm 22 being connected to a line in a telephone system and the contact arm being connected to ground as diagrammatically indicated in FIG. 4A. In that way, the device 14 is adapted to protect telephone circuit components 12a against a first level of surge condition with only temporary interruption of the telephone circuit but if a second relatively greater level of electrical surge occurs in the system such as would destroy the semiconducting surge protecting element, the device provides a second level of surge protection to protect the circuit and circuit components until the destroyed element is replaced.

Figure 1:
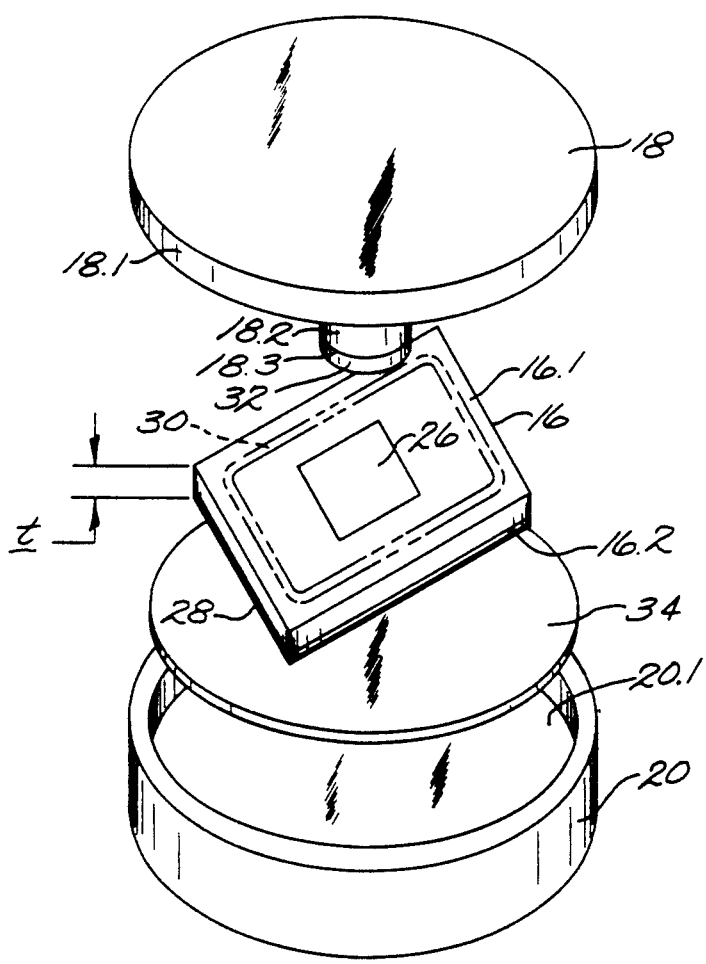
FIG. 1 is an exploded perspective of principle components of the novel and improved surge protector device of the invention illustrating assembly of the components with each other.
Figure 2:
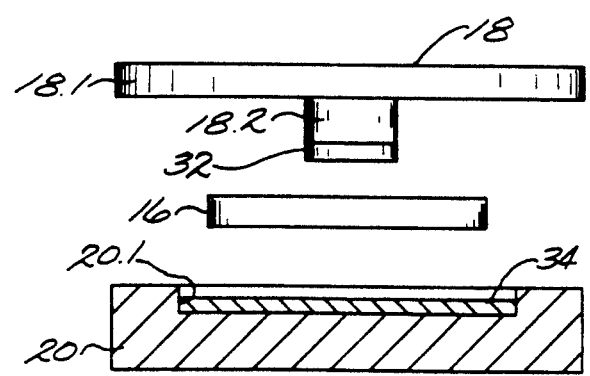
FIG. 2 is an exploded side elevation view similar to FIG. 1.
Figure 3:
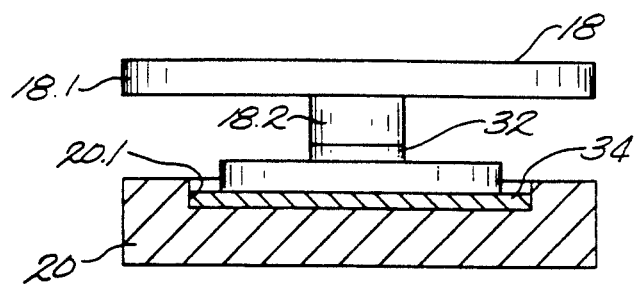
FIG. 3 is a side elevation view similar to FIG. 2 illustrating components of the surge protector device of FIG. 1 formed into subassembled relation to each other.

In accordance with the invention, the semiconducting surge protection element 16 is of generally conventional type. Preferably the device comprises a silicon semiconducting body having a reverse breakdown PN junction. In a preferred embodiment of the invention, the device comprises a bidirectional silicon semiconductor device such as a TISP3180 element made and sold by Texas Instruments Incorporated as shown in UK Pat. Publn. 2113907B having a critical energy conduction path through the device defined between a selected limited portion of one side 16.1 of the element and another opposite side 16.2 of the element as diagrammatically illustrated at 27 in FIG. 4A, that path being one along which electrical energy is preferentially conducted between the element sides and along which destruction of the element preferentially occurs due to overheating of the element in providing the second level of surge protection as described above. Preferably for example, the critical energy conduction path is defined between a terminal 26 (shown only in FIG. 1) disposed on a selected limited portion of one side 16.1 of the element and a corresponding terminal 28 disposed on an opposite side 16.2 of the element, the terminals being formed by metallizations or the like in any conventional manner. Where the element is bidirectional as preferred and has two adjacent preferential conduction paths for the respective conduction directions, the critical energy conduction path is considered to overlap the two adjacent paths. Typically a portion of a semiconducting element side, as diagrammatically indicated by the broken lines 30 on element side 16.1 in FIG. 1, requires an environmental or dielectric barrier seal or the like to protect some portion of the element from corrosion or the like or prevent shorting between element terminals by moisture and the like. Typically, the semiconductor element has a square or rectilinear configuration as shown in FIG. 1 although elements of other outlines are also possible within the scope of the invention.

In accordance with the invention the first electrically conductive electrode 18 through its geometrical configuration is disposed in electrically conductive relation to a limited part of one side of the semiconductor element 16. Preferably for example, the first electrode is provided with a disc part 18.1 having a post part 18.2 of relatively lesser cross-sectional size than the disc part. A distal end 18.3 of the post part of the first electrode is then provided with a solder coating 32 and is secured in electrically conductive relation to the desired limited part of the element side 16.1. Preferably for example, the distal end of the post part 18.2 is soldered to the terminal 26 to dispose the post part of the first electrode in electrically conductive engagement with the selected limited portion of the element side 16.1 which defines the critical energy conduction path as above described. Where the element is bidirectional the post part 18.2 and terminal 26 are arranged to overlap the preferential conduction path in each direction as noted above. The post part 18.2 of the first electrode has a length which at least equal and which preferably exceeds the thickness t of the semiconductor element 16.

The surge protector device 14 further comprises a second electrically conductive electrode 20 which is disposed in electrically conductive relation to the other opposite side 16.2 of the semiconducting element. Preferably, the second electrode is provided with a recess 20.1 which snugly receives the semiconducting element 16 therein for aligning the element in predetermined position relative to the second electrode. Preferably, a layer of solder material 34 is provided in the recess 20.1 for receiving the element 16 thereon and the solder is melted for securing the entire side 16.2 of the semiconducting element in secure, electrical conducting relation to the electrode and also for securing the second element side in heat-dissipating relation to the element. Where the second electrode is formed of copper or the like having high thermal conductivity, the second electrode serves to rapidly dissipate heat from the semiconducting element in providing the noted first level of surge protection. Preferably the first and second electrodes are coextensive as shown in FIGS. 1-6 so that disposition of the electrodes aligned in coextensive relation with each other precisely positions the distal end 18.3 of the first electrode with the critical energy conduction path defined under terminal 26 of the element. Preferably the element 16 is selected to be bidirectional or operable with alternate polarity and the coextensive electrodes permit the device 14 to be accommodated between contact arms 22, 24 or other contact engagement means with alternate polarity and without requiring any particular orientation as it is installed in a system 10.

In accordance with the invention, a seal 36 is provided on a selected part of the semiconducting element as indicated in FIG. 4A. In a preferred embodiment of the invention as shown in FIG. 4A for example, the seal comprises a loose epoxy preform or the like which is disposed on and adhered to the second limited portion 30 of the semiconducting element side 16.2 to provide an environmental and dielectric barrier seal over that second portion 30 of the element (not shown in FIG. 4A). The disc part 18.1 of the electrode is preferably spaced from the seal 36 as shown in FIG. 4A. In that arrangement, the electrodes 18, 20 of the device 14 are adapted to be engaged with the contact arms 22, 24 in the surge protection system circuit 12 and the semiconducting element 16 in the device 14 is normally nonconducting but is adapted to become conductive and connect the circuit to ground when the potential across the element exceeds the breakdown voltage of the element in response to a first level of surge in the circuit, thereby to provide a first level of surge protection for the circuit. When the electrical surge condition in the circuit is over, the element 16 again becomes nonconductive restoring normal operation of the circuit. However, if a surge condition is established in the circuit exceeding the first level of surge protection such that the semiconducting element is rapidly overheated and destroyed, preferentially along the critical energy conduction path 32 through the element, the electrodes 18 and 20 move rapidly toward each other and the post part of the electrode pierces through the element as shown at 16.3 in FIG. 4B, preferentially along the critical energy conduction path, to rapidly engage the second electrode to provide and maintain a short circuit condition between the electrodes until the destroyed element 16 is replaced. Preferably, the cross-sectional area of the post part of the first electrode is selected relative to the second surge protection level such that the surge condition resulting in destruction of the element 16 as above described serves to weld the distal end 18.3 of the first electrode post part to the second electrode as indicated at 38 in FIG. 4B. Typically the solder 32, 33 and the pierced material of the element 16 (not shown in FIG. 4B) are dispersed from the weld zone by forces resulting from the element destruction. Where the seal 36 is spaced from the disc part of the first electrode, the electrodes are adapted to move toward each other free of interference from the seal a will be understood.

Figure 5A:
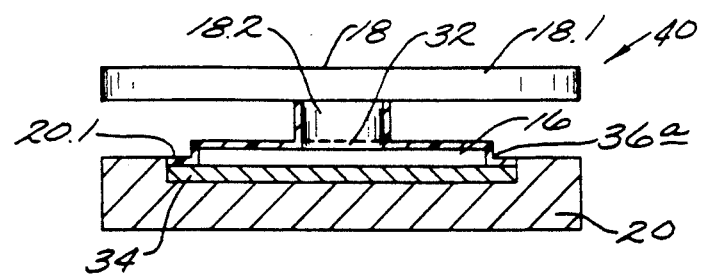
FIGS. 5A–5B and 6A–6B are similar to FIGS. 4A–4B illustrating alternate embodiments of the surge protector device of the invention.
Figure 5B:
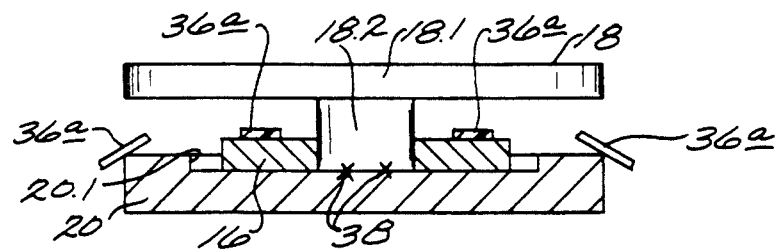

In another preferred embodiment of the surge protection device of the invention as indicated at 40 in FIGS. 5A–5B, wherein corresponding components are identified by corresponding reference numerals, an environmental seal 36 a is disposed over an edge and one side 16.1 of the semiconducting element and is adhered to the post part 18.2 of the first electrode and to the second electrode. The seal 36a is formed with a relatively thin, and brittle conformal coating material such as a polymeric material as shown in FIG. 5A. The material of the seal is selected so that it is easily broken in response to movement of the electrodes toward each other in the event of destruction of the semiconducting element 16 between the electrodes as shown in FIG. 5B.

Figure 6A:
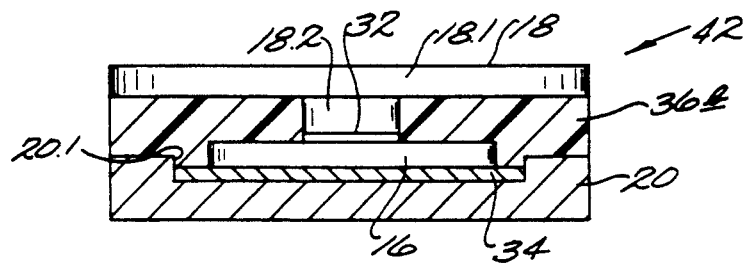
Figure 6B:
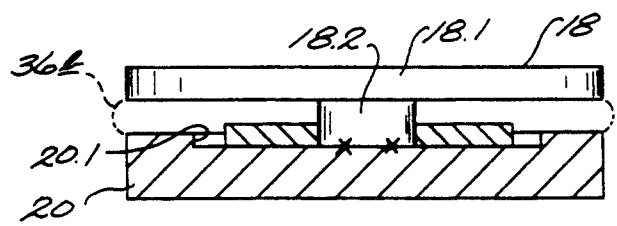

In another preferred embodiment of the surge protection device of the invention as indicated at 42 in FIGS. 6A–6B, wherein corresponding reference numerals are again used, a seal 36b is disposed around the semiconducting element and of the post part of the first electrode to substantially fill the space between the electrodes and to adhere to both electrodes as shown in FIG. 6A. The material of the seal is selected to be a material such as commonly sold under the trade name Parylene which is adapted to be vaporized, or blown apart by thermal expansion or the like, or otherwise destroyed as indicated diagrammatically by broken lines 36b in FIG. 6B by occurrence of overheating in the semiconducting element such as would result in destruction of the element, thereby to permit the electrodes to move easily together in providing the noted second level of surge protection as indicated in FIG. 6B.

In that arrangement, the surge protection devices 14, 40 and 42 are adapted to provide the desired first level of surge protection in a reliable and efficient way and are adapted to provide the desired second level of surge protection with improved speed and reliability to assure proper protection for circuit components and the like in the novel surge protection system of the invention. The surge protection device is also adapted to be disposed between the contact arms 22, 24 with either electrode engaging either contact arm. That is, the semiconducting element is preferentially selected to be operable with either polarity and the arrangement of the electrodes to be coextensive with each other permits the device to be accommodated between contact arms or the like with either orientation of the electrodes. The surge protector device is also characterized by ease of manufacture and assembly.

It should be understood that although particular embodiments of the invention have been described by way of illustrating the invention, the invention includes all modifications and equivalents of the disclosed embodiments falling within the scope of the appended claims.

We claim:

1. A surge protection device comprising a semiconducting disc element having two opposite sides, a first electrode in electrically conductive engagement with one of the sides of the element, a second electrode disposed in electrically conductive engagement with the other side of the element, the element being operable to selectively conduct electrical energy between the electrodes to provide a first level of surge protection, the electrodes being adapted to move into electrically conductive relation to each other to maintain a short circuit conduction between the electrodes in the event of element destruction in providing a second level of surge protection, and at least the first electrode being disposed in electrical engagement with only a limited portion of said one side of the element to selectively concentrate the electrical energy to said limited portion to ensure the establishment and maintenance of the short circuit condition between the electrodes in the event of the element destruction.

2. A surge protection device according to claim 1 wherein the semiconducting disc element provides a critical energy conduction path between the opposite sides of the element along which destruction of the element preferentially occurs in providing the second level of surge protection, the path being defined between a selected limited portion of said one element side and the second side, and the first electrode is disposed in said electrical engagement with said selected limited portion of said one element side.

3. A surge protection device according to claim 2 wherein the element has a selected thickness, and the first electrode comprises a disc part and a post part of lesser cross-sectional size extending from the disc part, the post part having a length at least as great as the element thickness and having a distal end thereof disposed in said electrical engagement with said selected limited portion of said one element side.

4. A surge protection device according to claim 3 having seal means disposed on a second portion of said one element side around said post part of the first electrode.

5. A surge protection device according to claim 3 wherein the element sides are of selected area and the disc part of the first electrode is of relatively greater area than said first element side and coextensive with the second electrode to facilitate connecting the electrodes in a circuit with alternate polarity.

6. A surge protection device according to claim 3 wherein the cross-sectional size of the post part of the first electrode is selected to facilitate welding of the post part to the second electrode in providing the second level of surge protection.

7. A surge protection device according to claim 1 wherein the second electrode is disposed in electrically conductive engagement with all of said other elements side to facilitate heat-dissipation from the element during provision of the first level of surge protection.

8. A surge protection device according to claim 7 wherein the second electrode has a recess receiving said second element side therein for aligning the element relative to the second electrode.

9. A surge protection device comprising a semiconducting disc element having a selected thickness and having two opposite sides of selected area, a first electrode having a disc part and having a post part of lesser cross-sectional size than the disc part extending from the disc part for a length at least as great as said selected thickness, the first electrode having a distal end of the post part received in electrically conductive engagement with a selected limited portion of one side of the element, and a second electrode having a recess receiving the opposite side of the element therein and having all of said other element sides secured in electrically conductive engagement with the second electrode in heat-dissipating relation to the second electrode, the element being operable to selectively conduct electrical energy between the electrodes to provide a first level of surge protection, and the electrodes being adapted to move toward each other to engage a distal end of the post part of the first electrode in electrically conductive relation to the second electrode to maintain a short circuit condition between the electrodes in the event of element destruction in providing a second relatively greater level of surge protection, the element providing a critical energy conduction path between the opposite sides of the element along which destruction of the element preferentially occurs due to overheating in providing the second level of surge protection, the path being defined between said claim 9 continued: selected limited portion of said one side of the element and the second side to facilitate establishment and maintenance of the short condition between the electrodes in the event of the element destruction.

10. A surge protection device according to claim 9 having environmental seal means disposed on a second portion of said one element side around said post part of the first electrode.

11. A surge protection device according to claim 10 wherein the seal means extends from said second electrode to the post part of the first electrode.

12. A surge protection device according to claim 11 wherein the seal means is spaced from the disc part of the first electrode to facilitate movement of the electrodes toward each other in the event of destruction of the element in providing the second level of surge protection.

13. A surge protection device according to claim 11 wherein the seal means has selected thickness and brittleness to be readily broken by bias of the electrodes towards each other in the event of destruction of the element in providing the second level of surge protection.

14. A surge protection device according to claim 11 wherein the seal means is selected to be destroyed during the overheating resulting in destruction of the element to facilitate movement of the electrodes toward each other in the event of destruction of the element in providing the second level of surge protection.

15. A surge protection system having at least one circuit and surge protection device for providing first and second levels of surge protection for the circuit, the surge protection device comprising a semiconducting disc element having two opposite sides, a first electrode in electrically conductive engagement with one of the sides of the element, a second electrode disposed in electrically conductive engagement with the other side of the element, the element being operable to selectively conduct electrical energy between the electrodes to provide a first level of surge protection, the electrodes being adapted to move into electrically conductive relation to each other to maintain a short circuit condition between the electrodes in the event of element destruction in providing a second level of surge protection, and at least the first electrode being disposed in electrical engagement with only a limited portion of said one side of the element to selectively concentrate the electrical energy to said limited portion to ensure the establishment and maintenance of the short circuit condition between the electrodes in the event of the element destruction.

16. A surge protector system according to claim 15 wherein the semiconducting disc element provides a critical energy conduction path between the opposite sides of the element along which destruction of the element preferentially occurs in providing the second level of surge protection, the path being defined between a selected limited portion of said one element side and the second side, and the first electrode is disposed in said electrical engagement with said selected limited portion of said one element side.

17. A surge protector system according to claim 16 wherein the element has a selected thickness, and the first electrode comprises a disc part and a post part of lesser cross-sectional size extending from the disc part, the post part having a length at least as great as the element thickness and having a distal end thereof disposed in said electrical engagement with said selected limited portion of said one element side.

18. A surge protector system according to claim 17 having seal means disposed on a second portion of said one element side around said post part of the first electrode.

19. A surge protector system according to claim 17 wherein the element sides are of selected area and the disc part of the first electrode is of relatively greater area than said first element side and coextensive with the second electrode to facilitate connecting the electrodes in a circuit with alternate polarity.

20. A surge protection system according to claim 17 wherein the cross-sectional size of the post part of the first electrode is selected to facilitate welding of the post part to the second electrode in providing the second level of surge protection.

21. A surge protection system according to claim 15 wherein the second electrode is disposed in electrically conductive engagement with all of said other elements side to facilitate heat-dissipation from the element during provision of the first level of surge protection.

22. A surge protection system according to claim 21 wherein the second electrode has a recess receiving said second element side therein for aligning the element relative to the second electrode.

23. A surge protection system having at least one circuit and surge protection device for providing first and second levels of surge protection for the circuit, the surge protection device comprising a semiconducting disc element having a selected thickness and having two opposite sides of selected area, a first electrode having a disc part and having a post part of lesser cross-sectional size than the disc part extending from the disc part for a length at least as great as said selected thickness, the first electrode having a distal end of the post part received in electrically conductive engagement with a selected limited portion of one side of the element, and a second electrode having a recess receiving the opposite side of the element therein and having all of said other element sides secured in electrically claim 23 continued: conductive engagement with the second electrode in heatdissipating relation to the second electrode, the element being operable to selectively conduct electrical energy between the electrodes to provide a first level of surge protection, and the electrodes being adapted to move toward each other to engage a distal end of the post part of the first electrode in electrically conductive relation to the second electrode to maintain a short circuit condition between the electrodes in the event of element destruction in providing a second relatively greater level of surge protection, the element providing a critical energy conduction path between the opposite sides of the element along which destruction of the element preferentially occurs due to overheating in providing the second level of surge protection, the path being defined between said selected limited portion of said one side of the element and the second side to facilitate establishment and maintenance of the short condition between the electrodes in the event of the element destruction.

24. A surge protection system according to claim 23 having environmental seal means disposed on a second portion of said one element side around said post part of the first electrode.

25. A surge protection system according to claim 24 wherein the seal means extends from said second electrode to the post part of the first electrode.

26. A surge protection system according to claim 25 wherein the seal means is spaced from the disc part of the first electrode to facilitate movement of the electrodes toward each other in the event of destruction of the element in providing the second level of surge protection.

27. A surge protection system according to claim 25 wherein the seal means has selected thickness and brittleness to be readily broken by bias of the electrodes towards each other in the event of destruction of the element in providing the second level of surge protection.

28. A surge protection system according to claim 25 wherein the seal means is selected to be destroyed during the overheating resulting in destruction of the element to facilitate movement of the electrodes toward each other in the event of destruction of the element in providing the second level of surge protection.

* * * * *